United States Patent
Tsuzuki

(10) Patent No.: US 10,892,110 B2
(45) Date of Patent: Jan. 12, 2021

(54) ELECTROLYTE SOLUTION FOR ELECTROCHEMICAL DEVICE, AND ELECTROCHEMICAL DEVICE

(71) Applicant: TAIYO YUDEN CO., LTD., Tokyo (JP)

(72) Inventor: Takeo Tsuzuki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/138,434

(22) Filed: Sep. 21, 2018

(65) Prior Publication Data
US 2019/0096594 A1    Mar. 28, 2019

(30) Foreign Application Priority Data
Sep. 27, 2017    (JP) .................................. 2017-186984

(51) Int. Cl.
| | |
|---|---|
| *H01G 11/62* | (2013.01) |
| *H01M 10/0525* | (2010.01) |
| *H01M 10/0567* | (2010.01) |
| *H01M 10/0569* | (2010.01) |
| *H01G 11/60* | (2013.01) |
| *H01G 11/64* | (2013.01) |
| *H01M 10/0568* | (2010.01) |

(52) U.S. Cl.
CPC .............. *H01G 11/62* (2013.01); *H01G 11/60* (2013.01); *H01G 11/64* (2013.01); *H01M 10/0525* (2013.01); *H01M 10/0567* (2013.01); *H01M 10/0568* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 2015/0125759 A1 | 5/2015 | Xu et al. | |
| 2015/0236380 A1* | 8/2015 | Garsuch | ............. H01M 10/052 429/338 |
| 2017/0117586 A1 | 4/2017 | DuBois et al. | |

FOREIGN PATENT DOCUMENTS

| | | |
|---|---|---|
| JP | 2001236990 A | 8/2001 |
| JP | 2003346898 A | 12/2003 |
| JP | 2014182889 A | 9/2014 |

(Continued)

OTHER PUBLICATIONS

A Notification of Reason for Refusal issued by Korean Intellectual Property Office, dated Jul. 17, 2019, for Korean counterpart application No. 1020180110756. (4 pages).

(Continued)

*Primary Examiner* — Haroon S. Sheikh
*Assistant Examiner* — Alex Rae
(74) *Attorney, Agent, or Firm* — Law Office of Katsuhiro Arai

(57) ABSTRACT

An electrolyte solution for electrochemical device contains: an electrolyte solution comprising a cyclic carbonate solvent containing 1.0 mol/L to 1.6 mol/L of $LiPF_6$ as an electrolyte; an oxalate complex salt of lithium whose additive quantity relative to the electrolyte solution accounts for 1.0 percent by weight to 3.0 percent by weight; and a straight-chain carbonate whose additive quantity relative to the electrolyte solution accounts for 1.0 percent by weight to 9.0 percent by weight.

6 Claims, 6 Drawing Sheets

(56) References Cited

FOREIGN PATENT DOCUMENTS

| JP | 2015079726 A | 4/2015 |
| KR | 20140106355 A | 9/2014 |
| KR | 20170009873 A | 1/2017 |

OTHER PUBLICATIONS

Sung Jun Lee et al., Effect of Lithium Bis(oxalato)borate Additive on Electrochemical Performance of Li1.17Ni0.17Mn0.5Co0.17O2 Cathodes for Lithium-Ion Batteries, Sep. 25, 2014, 161, A2012-A2019, Journal of The Electrochemical Society. (8 pages).

A Notification of Reason for Refusal issued by Korean Intellectual Property Office, dated Jan. 29, 2020, for Korean counterpart application No. 1020180110756. (4 pages).

\* cited by examiner

FIG. 5

| | Solvent [vol%] | Additive 1 | | Additive 2 | | Additive 3 | | Concentration of electrolytic solution [mol/L] | Initial characteristics | | After float test | |
|---|---|---|---|---|---|---|---|---|---|---|---|---|
| | | Type | Additive quantity [wt%] | Type | Additive quantity [wt%] | Type | Additive quantity [wt%] | | Capacitance [F] | Internal resistance [mΩ] | Capacitance maintenance rate [%] | Rate of change in internal resistance [%] |
| Example 1 | PC[100] | LiB(C₂O₄)₂ | 1.0 | DMC | 3.0 | - | - | 1.2 | 40 | 98 | 90 | 172 |
| Example 2 | PC[100] | LiB(C₂O₄)₂ | 1.0 | EMC | 3.0 | - | - | 1.2 | 40 | 100 | 91 | 170 |
| Example 3 | PC[100] | LiB(C₂O₄)₂ | 1.0 | DEC | 3.0 | - | - | 1.2 | 40 | 102 | 90 | 163 |
| Example 4 | PC[100] | LiB(C₂O₄)₂ | 2.0 | EMC | 3.0 | - | - | 1.2 | 39 | 100 | 88 | 180 |
| Example 5 | PC[100] | LiB(C₂O₄)₂ | 3.0 | EMC | 3.0 | - | - | 1.2 | 39 | 102 | 84 | 198 |
| Example 6 | PC[100] | LiB(C₂O₄)₂ | 1.0 | EMC | 9.0 | - | - | 1.2 | 40 | 96 | 88 | 187 |
| Example 7 | PC[100] | LiB(C₂O₄)₂ | 1.0 | EMC | 3.0 | VC | 1.0 | 1.2 | 39 | 112 | 90 | 176 |
| Example 8 | PC[100] | LiB(C₂O₄)₂ | 1.0 | EMC | 3.0 | FEC | 1.0 | 1.2 | 40 | 106 | 92 | 186 |
| Example 9 | PC[100] | LiB(C₂O₄)₂ | 1.0 | EMC | 3.0 | MBES | 1.0 | 1.2 | 39 | 118 | 90 | 184 |
| Comparative Example 1 | PC[100] | - | - | - | - | - | - | 1.2 | 40 | 95 | 84 | 780 |
| Comparative Example 2 | PC[100] | LiB(C₂O₄)₂ | 1.0 | - | - | - | - | 1.2 | 40 | 98 | 86 | 208 |
| Comparative Example 3 | PC[100] | LiB(C₂O₄)₂ | 1.0 | - | - | VC | 1.0 | 1.2 | 39 | 115 | 87 | 238 |
| Comparative Example 4 | PC[100] | LiB(C₂O₄)₂ | 5.0 | EMC | 3.0 | - | - | 1.2 | 38 | 104 | 75 | 360 |
| Comparative Example 5 | PC[100] | LiB(C₂O₄)₂ | 1.0 | EMC | 19.0 | - | - | 1.2 | 40 | 91 | 82 | 222 |
| Comparative Example 6 | EC/EMC/DMC [27/31/42] | LiBOB | 1.2 | - | - | FEC | 5.0 | 1.0 | 40 | 92 | 88 | 890 |

FIG. 6

| | Solvent [vol%] | Additive 1 | | Additive 2 | | Additive 3 | | Concentration of electrolytic solution [mol/L] | Initial characteristics | | After float test | |
|---|---|---|---|---|---|---|---|---|---|---|---|---|
| | | Type | Additive quantity [wt%] | Type | Additive quantity [wt%] | Type | Additive quantity [wt%] | | Capacitance [F] | Internal resistance [mΩ] | Capacitance maintenance rate [%] | Rate of change in internal resistance [%] |
| Example 10 | PC[100] | LiPF₂(C₂O₄)₂ | 1.0 | DMC | 3.0 | - | - | 1.2 | 40 | 102 | 90 | 180 |
| Example 11 | PC[100] | LiPF₂(C₂O₄)₂ | 1.0 | EMC | 3.0 | - | - | 1.2 | 40 | 103 | 91 | 176 |
| Example 12 | PC[100] | LiPF₂(C₂O₄)₂ | 1.0 | DEC | 3.0 | - | - | 1.2 | 40 | 105 | 88 | 187 |
| Example 13 | PC[100] | LiPF₂(C₂O₄)₂ | 2.0 | EMC | 3.0 | - | - | 1.2 | 39 | 108 | 88 | 188 |
| Example 14 | PC[100] | LiPF₂(C₂O₄)₂ | 3.0 | EMC | 3.0 | - | - | 1.2 | 38 | 110 | 85 | 198 |
| Example 15 | PC[100] | LiPF₂(C₂O₄)₂ | 1.0 | EMC | 9.0 | - | - | 1.2 | 40 | 108 | 87 | 194 |
| Example 16 | PC[100] | LiPF₂(C₂O₄)₂ | 1.0 | EMC | 3.0 | VC | 1.0 | 1.2 | 39 | 113 | 90 | 174 |
| Example 17 | PC[100] | LiPF₂(C₂O₄)₂ | 1.0 | EMC | 3.0 | FEC | 1.0 | 1.2 | 39 | 108 | 92 | 160 |
| Example 18 | PC[100] | LiPF₂(C₂O₄)₂ | 1.0 | EMC | 3.0 | MBES | 1.0 | 1.2 | 39 | 110 | 92 | 164 |
| Example 19 | PC[100] | LiPF₂(C₂O₄)₂ | 1.0 | DMC | 3.0 | - | - | 1.2 | 40 | 105 | 90 | 176 |
| Example 20 | PC[100] | LiPF₂(C₂O₄)₂ | 1.0 | EMC | 3.0 | - | - | 1.2 | 40 | 105 | 92 | 172 |
| Example 21 | PC[100] | LiPF₂(C₂O₄)₂ | 1.0 | DEC | 3.0 | FEC | 1.0 | 1.2 | 40 | 107 | 90 | 181 |
| Example 22 | PC[100] | LiPF₂(C₂O₄)₂ | 1.0 | EMC | 3.0 | - | - | 1.2 | 40 | 112 | 92 | 160 |
| Comparative Example 7 | PC[100] | - | - | - | - | - | - | 1.2 | 40 | 95 | 84 | 780 |
| Comparative Example 8 | PC[100] | LiPF₂(C₂O₄)₂ | 1.0 | - | - | - | - | 1.2 | 40 | 98 | 85 | 422 |
| Comparative Example 9 | PC[100] | LiPF₂(C₂O₄)₂ | 1.0 | - | - | - | - | 1.2 | 40 | 102 | 88 | 406 |
| Comparative Example 10 | PC[100] | LiPF₂(C₂O₄)₂ | 1.0 | - | - | VC | 1.0 | 1.2 | 39 | 110 | 84 | 287 |
| Comparative Example 11 | PC[100] | LiPF₂(C₂O₄)₂ | 1.0 | - | - | FEC | 1.0 | 1.2 | 39 | 106 | 85 | 243 |
| Comparative Example 12 | PC[100] | LiPF₂(C₂O₄)₂ | 5.0 | EMC | 3.0 | - | - | 1.2 | 36 | 102 | 78 | 242 |
| Comparative Example 13 | PC[100] | LiPF₂(C₂O₄)₂ | 1.0 | EMC | 18.0 | - | - | 1.2 | 40 | 105 | 82 | 228 |

ELECTROLYTE SOLUTION FOR ELECTROCHEMICAL DEVICE, AND ELECTROCHEMICAL DEVICE

BACKGROUND

Field of the Invention

The present invention relates to an electrolyte solution for electrochemical device, as well as an electrochemical device.

Description of the Related Art

Electrochemical devices using a non-aqueous electrolyte solution, such as electric double-layer capacitors and lithium ion capacitors, can have a high withstand voltage due to a high electrolytic voltage of the solvent, and thus can store a large amount of energy.

In recent years, there is a call for ensuring the reliability of electrochemical devices in high-temperature conditions. As for their high-temperature reliability, electrochemical devices are believed to suffer deteriorating cell characteristics for such reasons as production of hydrogen fluoride, etc., as a result of decomposition of anions such as $PF_6^-$ which is an electrolyte, and formation of a highly resistant film through reductive decomposition of the electrolyte solution near the negative electrode.

To solve the aforementioned problems, Patent Literature 1 discloses a lithium ion battery that uses an electrolyte solution prepared by mixing lithium tetrafluoroborate ($LiBF_4$) and lithium bis (pentafluoroethyl sulfonyl) imide (LiBETI) at a specific ratio, for example. Patent Literature 2 discloses a lithium ion battery that uses an electrolyte solution constituted by lithium hexafluorophosphate ($LiPF_6$) with some $LiBF_4$ added to improve high-temperature storage properties. Patent Literature 3 discloses a non-aqueous electrolytic battery whose electrolyte solution contains vinylene carbonate and oxalate salt in order to reduce a rise in DCR when the device is stored at high temperature. Patent Literature 4 discloses a non-aqueous electrolytic battery whose electrolyte solution contains fluorine-containing carbonate and lithium borate salt in order to achieve stable charge/discharge cycles over a wide temperature range.

BACKGROUND ART LITERATURES

[Patent Literature 1] Japanese Patent Laid-open No. 2001-236990
[Patent Literature 2] Japanese Patent Laid-open No. 2003-346898
[Patent Literature 3] Japanese Patent Laid-open No. 2015-79726
[Patent Literature 4] Japanese Patent Laid-open No. 2014-182889

SUMMARY

When an electrolyte solution prepared by mixing $LiBF_4$ and LiBETI at a specific ratio is used, as described in Patent Literature 1, the stability of the electrolyte solution at high temperature improves over that of an electrolyte solution whose electrolyte is $LiPF_6$, because of a high heat resistance level of the electrolyte and a high electrical conductivity level of LiBETI; however, LiBETI corrodes the current collecting foil (aluminum) when the positive electrode potential is around 4 V (vs. $Li/Li^+$), which presents an issue in terms of long-term reliability.

Patent Literature 2 discloses using an electrolyte solution constituted by $LiPF_6$ with some $LiBF_4$ added, to reduce battery degradation from storage at high temperature; however, although this is effective at high temperature (60° C.) where $LiPF_6$ does not decompose much under heat, the thermal decomposition of $LiPF_6$ cannot be ignored, and thus battery reliability is not expected to improve, in a 85° C. environment.

Patent Literature 3 describes that by aging a cell produced by adding small quantities of oxalate salt and vinylene carbonate to the electrolyte solution, a rise in DCR can be reduced during storage at high temperature; however, achieving reliability at higher temperature is difficult given the disclosure indicating that aging such cell at temperatures above 60° C. resulted in a considerably worse DCR.

Patent Literature 4 discloses that adding lithium bis (oxalate) borate and fluoroethylene carbonate to the electrolyte solution improves cycle reliability at high temperature (60° C.); in a 85° C. environment, however, adding fluoroethylene carbonate by a larger quantity causes the unreacted fluoroethylene carbonate to decompose and the DCR to rise as a result. Also, a presence of straight-chain carbonate at or higher than a certain ratio in the electrolyte solution accelerates the decomposition of $LiPF_6$ as the electrolyte at high temperature, which again causes the DCR to rise.

The present invention was developed in light of the aforementioned problems, and its object is to provide an electrolyte solution for electrochemical device that can improve the high-temperature reliability of an electrochemical device, as well as an electrochemical device provided with such electrolyte solution.

Any discussion of problems and solutions involved in the related art has been included in this disclosure solely for the purposes of providing a context for the present invention, and should not be taken as an admission that any or all of the discussion were known at the time the invention was made.

The electrolyte solution for electrochemical device pertaining to the present invention is characterized in that it contains: an electrolyte solution comprising a cyclic carbonate solvent containing 1.0 mol/L to 1.6 mol/L of $LiPF_6$ as an electrolyte; an oxalate complex salt of lithium whose additive quantity relative to the electrolyte solution accounts for 1.0 percent by weight to 3.0 percent by weight; and a straight-chain carbonate whose additive quantity relative to the electrolyte solution accounts for 1.0 percent by weight to 9.0 percent by weight.

Regarding the electrolyte solution for electrochemical device, the oxalate complex salt may be at least one of lithium bis (oxalate) borate, lithium difluorobis (oxalate) phosphate, and lithium tetrafluorooxalate phosphate.

Regarding the electrolyte solution for electrochemical device, the straight-chain carbonate may be at least one of dimethyl carbonate, ethyl methyl carbonate, and diethyl carbonate.

Regarding the electrolyte solution for electrochemical device, it may further contain vinylene carbonate, fluoroethylene carbonate, or methylene bis (ethane sulfonate), whose additive quantity relative to the electrolyte solution accounts for 1.0 percent by weight to 3.0 percent by weight.

The electrochemical device pertaining to the present invention is characterized in that: it comprises an electric storage element constituted by a positive electrode, and a negative electrode, which are layered with separators in between; and the electrolyte solution for electrochemical device according to any one of the foregoing is impregnated into the active material for the positive electrode and active material for the negative electrode, or into the separators.

According to the present invention, an electrolyte solution for electrochemical device that can improve the high-temperature reliability of an electrochemical device, as well as an electrochemical device provided with such electrolyte solution, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 5 is a table showing the test results.

FIG. 6 is a table showing the test results.

DESCRIPTION OF THE SYMBOLS

Figure 1:
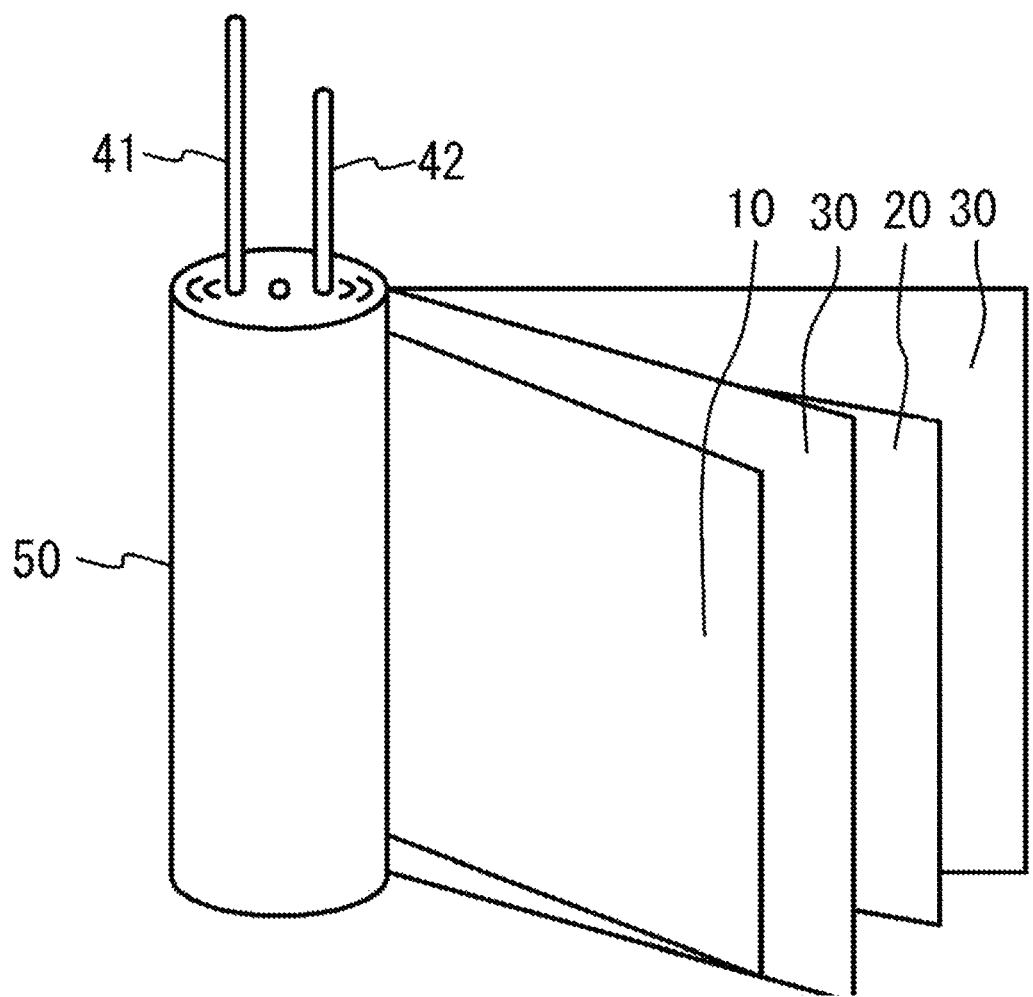
FIG. 1 is an exploded view of a lithium ion capacitor.

10 Positive electrode
11 Positive-electrode collector
12 Positive-electrode layer
20 Negative electrode
21 Negative-electrode collector
22 Negative electrode layer
30 Separator
41, 42 Lead terminal
50 Electric storage element
60 Rubber seal
70 Container
100 Lithium ion capacitor

DETAILED DESCRIPTION OF EMBODIMENTS

An embodiment is explained below by referring to the drawings.

Embodiment

First, a lithium ion capacitor is explained as an example of electrochemical device. FIG. 1 is an exploded view of a lithium ion capacitor 100. As illustrated in FIG. 1, the lithium ion capacitor 100 has an electric storage element 50 which is structured in such a way that a positive electrode 10, and a negative electrode 20, are wound together via separators 30 in between. The electric storage element 50 has a roughly columnar shape. A lead terminal 41 is connected to the positive electrode 10. A lead terminal 42 is connected to the negative electrode 20.

Figure 2:
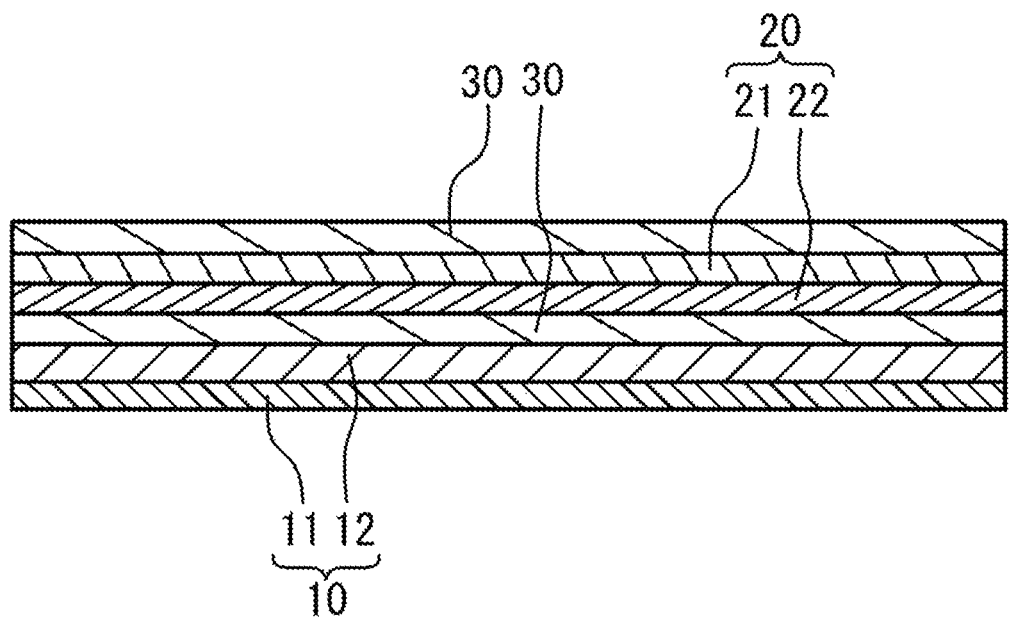
FIG. 2 is a cross-sectional view of a positive electrode 10, a negative electrode 20, and separators 30, in the laminating direction.

FIG. 2 is a cross-sectional view of the positive electrode 10, negative electrode 20, and separators 30 in the laminating direction. As illustrated in FIG. 2, the positive electrode 10 is structured in such a way that a positive-electrode layer 12 is layered on one side of a positive-electrode collector 11. A separator 30 is layered on top of the positive-electrode layer 12 of the positive electrode 10. The negative electrode 20 is layered on top of the separator 30. The negative electrode 20 is structured in such a way that a negative electrode layer 22 is layered on the positive electrode 10 side of a negative-electrode collector 21. A separator 30 is layered on top of the negative-electrode collector 21 of the negative electrode 20. The electric storage element 50 is constituted by a wound, layered unit which comprises the aforementioned positive electrode 10, separator 30, negative electrode 20, and separator 30. It should be noted that the positive-electrode layer 12 may be provided on both sides of the positive-electrode collector 11. The negative electrode layer 22 may be provided on both sides of the negative-electrode collector 21.

Figure 3:
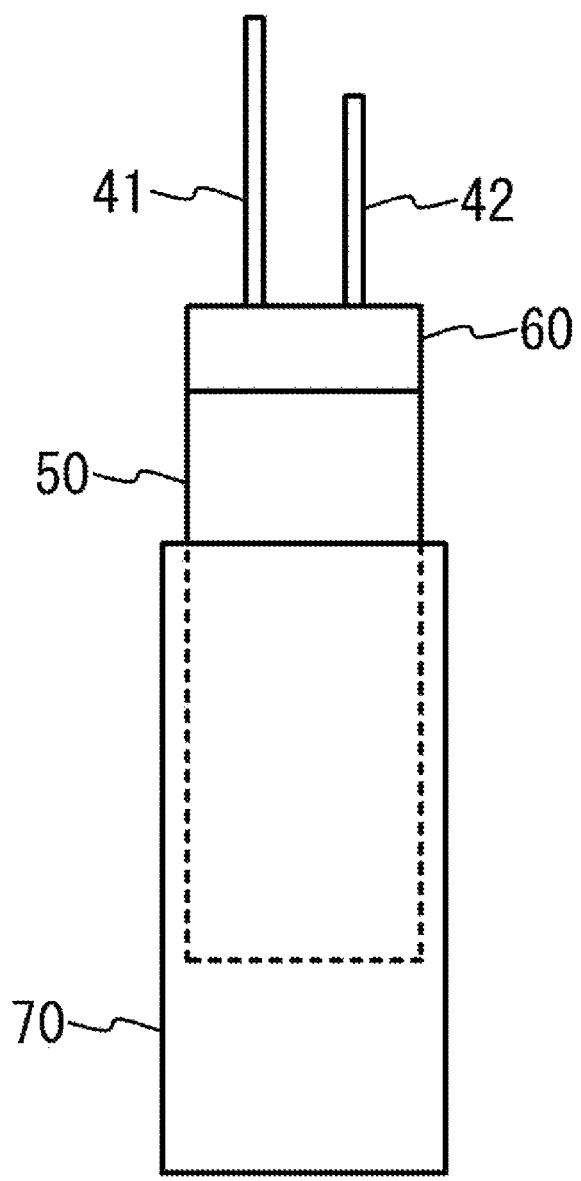
FIG. 3 is an exploded view of a lithium ion capacitor.
Figure 4:
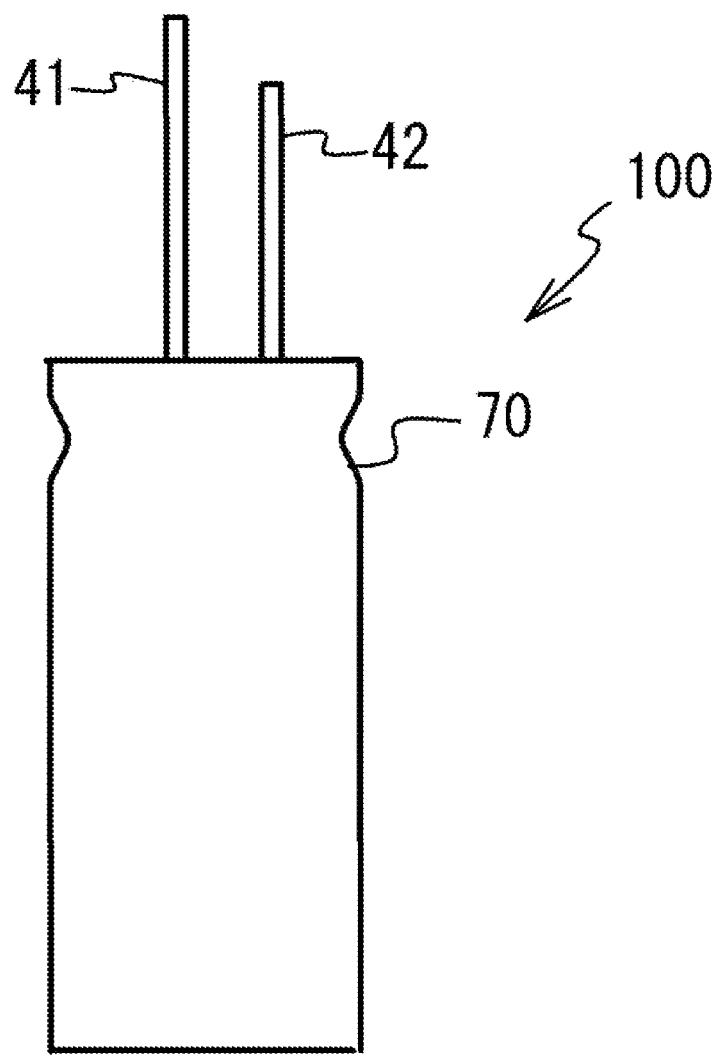
FIG. 4 is an external view of a lithium ion capacitor.

As illustrated in FIG. 3, the lead terminals 41, 42 are respectively inserted into two through holes provided in a rubber seal 60 of roughly columnar shape having a diameter roughly the same as that of the electric storage element 50. Also, the electric storage element 50 is housed in a container 70 of roughly cylindrical shape with a bottom. As illustrated in FIG. 4, the rubber seal 60 is caulked along the periphery of the opening of the container 70. This keeps the electric storage element 50 sealed. A non-aqueous electrolyte solution is charged in the container 70 and impregnated into the active material for the positive electrode 10 and active material for the negative electrode 20, or into the separators 30.

(Positive Electrode)

The positive-electrode collector 11 is a metal foil, which is an aluminum foil, etc., for example. This aluminum foil may be a perforated foil. It suffices that the positive-electrode layer 12 is made of a known material, and has a known structure, used for electrode layers of electric double-layer capacitors and redox capacitors, and contains polyacene (PAS), polyaniline (PAN), active carbon, carbon black, graphite, carbon nano-tubes, or other active material, for example, as well as, if necessary, conductive auxiliary agent, binder, and other components used for electrode layers of electric double-layer capacitors, etc.

(Negative Electrode)

The negative-electrode collector 21 is a metal foil, which is a copper foil, etc., for example. This copper foil may be a perforated foil. The negative electrode layer 22 contains non-graphitizable carbon, tin oxide, silicon oxide, or other active material, for example, as well as, if necessary, carbon black, metal powder, or other conductive auxiliary agent, and polytetrafluoroethylene (PTFE), polyvinylidene fluoride (PVDF), styrene butadiene rubber (SBR), or other binder.

(Separator)

The separator 30 is provided between the positive electrode 10 and the negative electrode 20, for example, to prevent short-circuiting of the two electrodes due to contact. The separator 30 retains the non-aqueous electrolyte solution in its pores to form conductive paths between the electrodes. For the material of the separator 30, any porous cellulose, polypropylene, polyethylene, fluororesin, etc., may be used, for example.

It should be noted that, when the electric storage element 50 and non-aqueous electrolyte solution are sealed in the container 70, a lithium metal sheet is electrically connected to the negative electrode 20. This way, lithium in the lithium metal sheet dissolves in the non-aqueous electrolyte solution and lithium ions are pre-doped into the negative electrode layer 22 of the negative electrode 20. As a result, the potential of the negative electrode 20 becomes lower than the potential of the positive electrode 10 by approx. 3 V, for example, in a condition before charging.

Also, in this embodiment, the lithium ion capacitor 100 is structured in such a way that the wound electric storage element 50 is sealed in the cylindrical container 70; however, the present invention is not limited to the foregoing. For example, the electric storage element 50 may have a laminate structure. In this case, the container 70 may be a square can, etc.

(Non-Aqueous Electrolyte Solution)

The non-aqueous electrolyte solution may be produced by dissolving an electrolyte in a non-aqueous solvent and then adding additives thereto. First, a cyclic carbonate is used as the non-aqueous solvent. The cyclic carbonate is a propylene carbonate (PC), etc., being a cyclic ester carbonate. A cyclic ester carbonate has a high dielectric constant and thus has a property of dissolving lithium salts well. Also, a non-aqueous electrolyte solution using a cyclic ester carbonate as its non-aqueous solvent has a high ion conductivity. Accordingly, the lithium ion capacitor 100 exhibits good initial properties when a cyclic carbonate is used as its non-aqueous solvent. Also, use of a cyclic carbonate as its non-aqueous solvent allows the lithium ion capacitor 100 to achieve sufficient electrochemical stability during operation once a film has been formed on the negative electrode 20.

For the electrolyte, $LiPF_6$, which is a lithium salt, is used. Among general lithium salts, $LiPF_6$ has a high degree of dissociation and thus allows the lithium ion capacitor 100 to achieve good initial properties (capacitance and DCR). If the concentration of the electrolyte in the non-aqueous electrolyte solution (concentration of electrolyte solution) is too high, the viscosity of the electrolyte solution rises and it takes a long time for the necessary quantity of ions to be supplied to the electrode, and therefore the initial internal resistance may rise. If the concentration of electrolyte solution is too low, on the other hand, supply of the necessary quantity of ions to the electrode does not occur or takes a long time, in which case the initial capacitance may drop and the initial internal resistance may rise. Accordingly, upper and lower limits are set for the concentration of electrolyte solution. In this embodiment, the concentration of electrolyte solution is 1.0 mol/L or higher but no higher than 1.6 mol/L. Preferably the concentration of electrolyte solution is 1.0 mol/L or higher but no higher than 1.2 mol/L. It should be noted that, in this embodiment, LiBFTI is not used as the electrolyte, and thus corrosion of the positive electrode 10 is reduced.

(First Additive)

For the first additive to be added to the non-aqueous electrolyte solution, an oxalate complex salt of lithium is used. An oxalate complex salt of lithium forms, on the negative electrode 20, a thin, strong, and dense film that allows lithium ions to enter and exit it with ease. Formation of this film reduces the formation of a high-resistance film on the negative electrode 20 attributable to a thermal decomposition product of $LiPF_6$. This results in a higher capacitance maintenance rate, and a smaller change in the internal resistance, of the lithium ion capacitor 100 when it is exposed to high temperature. For the oxalate complex salt of lithium, lithium bis (oxalate) borate ($LiB(C_2O_4)_2$), lithium difluorobis (oxalate) phosphate ($LiPF_2(C_2O_4)_2$), lithium tetrafluorooxalate phosphate ($LiPF_4(C_2O_4)$), etc., may be used. If the concentration of the first additive in the non-aqueous electrolyte solution is too low, obtaining a sufficient effect of the first additive becomes difficult. Accordingly, a lower limit is set for the concentration of the first additive in the non-aqueous electrolyte solution. If the concentration of the first additive in the non-aqueous electrolyte solution is too high, on the other hand, a thick, sparse film is formed on the negative electrode 20, which may increase the initial internal resistance, and also cause a large change in the internal resistance, of the lithium ion capacitor 100 as a result. Accordingly, an upper limit is set for the concentration of the first additive in the non-aqueous electrolyte solution. In this embodiment, the concentration of the first additive in the non-aqueous electrolyte solution is 1.0 percent by weight to 3.0 percent by weight.

(Second Additive)

For the second additive to be added to the non-aqueous electrolyte solution, a straight-chain carbonate is used. A straight-chain carbonate is used to increase the capacitance maintenance rate, and reduce the change in the internal resistance, of the lithium ion capacitor 100 when it is exposed to high temperature. These effects are probably explained by a drop in the viscosity of the electrolyte solution achieved by adding a small quantity of straight-chain carbonate to the electrolyte solution, which then causes the oxalate complex salt to act more uniformly on the negative electrode 20 and allows a thinner, more homogeneous and stronger film to be formed as a result. For the straight-chain carbonate, dimethyl carbonate (DMC), ethyl methyl carbonate (EMC), diethyl carbonate (DEC), etc., may be used. If the concentration of the second additive in the non-aqueous electrolyte solution is too low, obtaining a sufficient effect of the second additive becomes difficult. Accordingly, a lower limit is set for the concentration of the second additive in the non-aqueous electrolyte solution. If the concentration of the second additive in the non-aqueous electrolyte solution is too high, on the other hand, the dissociation of $LiPF_6$ in the electrolyte solution is obstructed and $LiPF_6$ may accelerate its thermal decomposition at high temperature. Accordingly, an upper limit is set for the concentration of the second additive in the non-aqueous electrolyte solution. In this embodiment, the concentration of the second additive in the non-aqueous electrolyte solution is 1.0 percent by weight to 9.0 percent by weight.

(Third Additive)

To further reduce the change in the internal resistance of the lithium ion capacitor 100 when it is exposed to high temperature, an agent that forms a film to protect the negative electrode 20, such as vinylene carbonate (VC), fluoroethylene carbonate (FEC), methylene bis (ethane sulfonate) (MBES), etc., may be added as a third additive in addition to the first additive and second additive. Any other additive may be added as the third additive so long as it represents a material that acts upon the negative electrode 20 and forms a stable film. To achieve a sufficient effect of the third additive, preferably a lower limit is set for the concentration of the third additive. If the concentration of the third additive in the non-aqueous electrolyte solution becomes too high, on the other hand, a thick film may be formed on the negative electrode 20, resulting in a higher initial internal resistance and a larger change in internal resistance. Accordingly, preferably an upper limit is set for the concentration of the third additive in the non-aqueous electrolyte solution. In this embodiment, preferably the concentration of the third additive in the non-aqueous electrolyte solution is 1.0 percent by weight to 3.0 percent by weight.

In this embodiment, a cyclic carbonate is used as the non-aqueous solvent, and an oxalate complex salt of lithium is added by 1.0 percent by weight to 3.0 percent by weight, and a straight-chain carbonate is added by 1.0 percent by weight to 9.0 percent by weight, to the non-aqueous electrolyte solution whose electrolyte is $LiPF_6$; as a result, the lithium ion capacitor 100 can achieve a good capacitance maintenance rate and any change in its internal resistance can be reduced sufficiently, even when exposed to high temperature, and therefore its high-temperature reliability can be improved.

It should be noted that, while this embodiment focuses on the electrolyte solution of a lithium ion capacitor, the electrochemical device is not limited thereto. For example, the non-aqueous electrolyte solution pertaining to this embodiment may be used as the electrolyte solution of other electrochemical devices such as an electric double-layer capacitor.

EXAMPLES

Lithium ion capacitors were produced according to the aforementioned embodiment and their properties were examined.

Example 1

PAS was used as the active material for positive electrode 10. A slurry was prepared using a mixture of carboxy methyl cellulose and styrene butadiene rubber as a binder, and the prepared slurry was applied, in a sheet shape, onto a perforated aluminum foil. As the active material for negative electrode 20, non-graphitizable carbon made of phenolic resin material was used. A slurry was prepared using a mixture of carboxy methyl cellulose and styrene butadiene rubber as a binder, and the prepared slurry was applied, in a sheet shape, onto a perforated copper foil. After layering these electrodes with cellulose separators 30, a lead terminal 41 was installed on a positive-electrode collector 11, and a lead terminal 42 was installed on a negative-electrode collector 21, both via ultrasonic welding, after which all components were wound into an electric storage element 50 and then secured with a polyimide adhesive tape. After installing a rubber seal 60 thereon, the produced electric storage element 50 was vacuum-dried at approx. 180° C., after which a lithium foil was attached to the negative electrode 20 and the electric storage element 50 was put in a container 70. Thereafter, $LiB(C_2O_4)_2$ was added by 1.0 percent by weight, and also DMC was added by 3.0 percent by weight, as additives, to a solution (1.20 mol/L) prepared by dissolving $LiPF_6$ in PC, after which the obtained non-aqueous electrolyte solution was poured into the container 70 and the rubber seal 60 was caulked, to produce a lithium ion capacitor 100. It should be noted that the lithium ion capacitor thus produced was aged at 85° C. for 24 hours.

Example 2

In Example 2, EMC instead of DMC was added by 3.0 percent by weight. The remaining conditions were the same as those in Example 1.

Example 3

In Example 3, DEC instead of DMC was added by 3.0 percent by weight. The remaining conditions were the same as those in Example 1.

Example 4

In Example 4, the additive quantity of $LiB(C_2O_4)_2$ was adjusted to 2.0 percent by weight relative to the electrolyte solution, and EMC instead of DMC was added by 3.0 percent by weight. The remaining conditions were the same as those in Example 1.

Example 5

In Example 5, the additive quantity of $LiB(C_2O_4)_2$ was adjusted to 3.0 percent by weight relative to the electrolyte solution, and EMC instead of DMC was added by 3.0 percent by weight. The remaining conditions were the same as those in Example 1.

Example 6

In Example 6, EMC instead of DMC was added by 9.0 percent by weight. The remaining conditions were the same as those in Example 1.

Example 7

In Example 7, EMC instead of DMC was added by 3.0 percent by weight, and also VC was added by 1.0 percent by weight relative to the electrolyte solution. The remaining conditions were the same as those in Example 1.

Example 8

In Example 8, EMC instead of DMC was added by 3.0 percent by weight instead of DMC, and also FEC was added by 1.0 percent by weight relative to the electrolyte solution. The remaining conditions were the same as those in Example 1.

Example 9

In Example 9, EMC instead of DMC was added by 3.0 percent by weight, and also methylene bis (ethane sulfonate) (MBES) was added by 1.0 percent by weight relative to the electrolyte solution. The remaining conditions were the same as those in Example 1.

Comparative Example 1

In Comparative Example 1, $LiB(C_2O_4)_2$ and DMC were not added to the electrolyte solution. The remaining conditions were the same as those in Example 1.

Comparative Example 2

In Comparative Example 2, DMC was not added to the electrolyte solution. The remaining conditions were the same as those in Example 1.

Comparative Example 3

In Comparative Example 3, DMC was not added to the electrolyte solution, and VC was also added to the electrolyte solution by 1.0 percent by weight. The remaining conditions were the same as those in Example 1.

Comparative Example 4

In Comparative Example 4, the additive quantity of $LiB(C_2O_4)_2$ was changed to 5.0 percent by weight relative to the electrolyte solution, and EMC instead of DMC was added by 3.0 percent by weight. The remaining conditions were the same as those in Example 1.

Comparative Example 5

In Comparative Example 5, EMC instead of DMC was added by 18.0 percent by weight. The remaining conditions were the same as those in Example 1.

Comparative Example 6

In Comparative Example 6, a solvent combining EC/EMC/DMC at a ratio of 27/31/42 (vol %) was used for the electrolyte solution, and as additives, $LiB(C_2O_4)_2$ was added by 1.2 percent by weight relative to the electrolyte solution, and FEC was added by 5.0 percent by weight relative to the electrolyte solution, to achieve a concentration of electrolyte solution of 1.0 mol/L. The remaining conditions were the same as those in Example 1.

(Evaluation Method)

After the lithium ion capacitors in Examples 1 to 9 and Comparative Examples 1 to 6 had been produced, their capacitance and internal resistance at room temperature were measured as initial properties. Thereafter, the lithium ion capacitors underwent a float test in which they were charged continuously for 1000 hours at a voltage of 3.8 V in a thermostatic chamber adjusted to 85° C. After the float test, the cells were let cool to room temperature, and then measured for capacitance and internal resistance, to calculate the rates of change before and after the test. The results (capacitance maintenance rate and rate of change in internal resistance) are shown in FIG. 5.

(Initial Properties)

In Examples 1 to 9 and Comparative Examples 1 to 6, the values of initial capacitance and internal resistance characteristics were good. This is probably explained by the use of a cyclic carbonate as a non-aqueous solvent and adjustment of the $LiPF_6$ concentration to between 1.0 mol/L and 1.6 mol/L.

(High-Temperature Reliability)

In Comparative Example 1, the capacitance maintenance rate was low and the rate of change in internal resistance was high. This is probably explained by no additive being added to the non-aqueous electrolyte solution. Next, in Comparative Examples 2 and 3, the drop in capacitance maintenance rate and the rise in rate of change in internal resistance were reduced compared to Comparative Example 1, but the rate of change in internal resistance did not become sufficiently low and still remained above 200%. This is probably explained by no second additive being added to the non-aqueous electrolyte solution, although the first additive was added. Next, in Comparative Examples 4 and 5, the rate of change in internal resistance did not become sufficiently low despite adding the first additive and second additive. In Comparative Example 4, this is probably explained by the additive quantity of the first additive being too large. In Comparative Example 5, this is probably explained by the additive quantity of the second additive being too large.

By contrast, the drop in capacitance maintenance rate was reduced, and the rate of change in internal resistance also became sufficiently low (below 200%), in Examples 1 to 6. This is probably explained by the addition, as the first additive, of an oxalate complex salt of lithium by 1.0 percent by weight to 3.0 percent by weight in concentration, and the addition, as the second additive, of a straight-chain carbonate by 1.0 percent by weight to 9.0 percent by weight. Next, in Examples 7 to 9, the rate of change in internal resistance became even lower than in Examples 1 to 6. This is probably explained by the further addition of the third additive by 1.0 percent by weight to 3.0 percent by weight.

It should be noted that, in Comparative Example 6, the capacitance maintenance rate became significantly low, while the rate of change in internal resistance became significantly high. This is probably explained by the quantities of straight-chain carbonate and FEC being larger than necessary.

Example 10

In Example 10, $LiPF_2(C_2O_4)_2$ was added by 1.0 percent by weight as the first additive. The remaining conditions were the same as those in Example 1.

Example 11

In Example 11, EMC instead of DMC was added by 3.0 percent by weight; the remaining conditions were the same as those in Example 10.

Example 12

In Example 12, DEC instead of DMC was added by 3.0 percent by weight; the remaining conditions were the same as those in Example 10.

Example 13

In Example 13, $LiPF_2(C_2O_4)_2$ was added by 2.0 percent by weight, and EMC instead of DMC was added by 3.0 percent by weight; the remaining conditions were the same as those in Example 10.

Example 14

In Example 14, $LiPF_2(C_2O_4)_2$ was added by 3.0 percent by weight, and EMC instead of DMC was added by 3.0 percent by weight; the remaining conditions were the same as those in Example 10.

Example 15

In Example 15, EMC instead of DMC was added by 9.0 percent by weight; the remaining conditions were the same as those in Example 10.

Example 16

In Example 16, EMC instead of DMC was added by 3.0 percent by weight, and VC was also added by 1.0 percent by weight relative to the electrolyte solution; the remaining conditions were the same as those in Example 10.

Example 17

In Example 17, EMC instead of DMC was added by 3.0 percent by weight, and FEC was also added by 1.0 percent by weight relative to the electrolyte solution; the remaining conditions were the same as those in Example 10.

Example 18

In Example 18, EMC instead of DMC was added by 3.0 percent by weight, and MBES was also added by 1.0 percent by weight relative to the electrolyte solution; the remaining conditions were the same as those in Example 10.

Example 19

In Example 19, $LiPF_4(C_2O_4)$ instead of $LiPF_2(C_2O_4)_2$ was added by 1.0 percent by weight; the remaining conditions were the same as those in Example 10.

Example 20

In Example 20, $LiPF_4(C_2O_4)$ instead of $LiPF_2(C_2O_4)_2$ was added by 1.0 percent by weight, and EMC instead of DMC was added by 3.0 percent by weight; the remaining conditions were the same as those in Example 10.

Example 21

In Example 21, $LiPF_4(C_2O_4)$ instead of $LiPF_2(C_2O_4)_2$ was added by 1.0 percent by weight, and DEC instead of DMC was added by 3.0 percent by weight; the remaining conditions were the same as those in Example 10.

Example 22

In Example 22, $LiPF_4(C_2O_4)$ instead of $LiPF_2(C_2O_4)_2$ was added by 1.0 percent by weight, EMC instead of DMC was added by 3.0 percent by weight, and FEC was also added by 1.0 percent by weight relative to the electrolyte solution; the remaining conditions were the same as those in Example 10.

Comparative Example 7

In Comparative Example 7, $LiPF_2(C_2O_4)_2$ and DMC were not added to the electrolyte solution; the remaining conditions were the same as those in Example 10.

Comparative Example 8

In Comparative Example 8, DMC was not added to the electrolyte solution; the remaining conditions were the same as those in Example 10.

Comparative Example 9

In Comparative Example 9, $LiPF_4(C_2O_4)$ instead of $LiPF_2(C_2O_4)_2$ was added by 1.0 percent by weight, and DMC was not added to the electrolyte solution; the remaining conditions were the same as those in Example 10.

Comparative Example 10

In Comparative Example 10, DMC was not added, and VC was added by 1.0 percent by weight; the remaining conditions were the same as those in Example 10.

Comparative Example 11

In Comparative Example 11, DMC was not added, and FEC was added by 1.0 percent by weight; the remaining conditions were the same as those in Example 10.

Comparative Example 12

In Comparative Example 12, $LiPF_2(C_2O_4)_2$ was added by 5.0 percent by weight, and EMC instead of DMC was added by 3.0 percent by weight; the remaining conditions were the same as those in Example 10.

Comparative Example 13

In Comparative Example 13, EMC instead of DMC was added by 18.0 percent by weight; the remaining conditions were the same as those in Example 10.

(Evaluation Method)

Examples 10 to 22 and Comparative Examples 7 to 13 were evaluated in the same way Examples 1 to 9 and Comparative Examples 1 to 6 were evaluated.

(Initial Properties)

In Examples 10 to 22 and Comparative Examples 7 to 13, the values of capacitance and internal resistance in initial properties were good. This is probably explained by the use of a cyclic carbonate as a non-aqueous solvent and adjustment of the $LiPF_6$ concentration to between 1.0 mol/L and 1.6 mol/L.

(High-Temperature Reliability)

In Comparative Example 7, the capacitance maintenance rate was low and the rate of change in internal resistance was high. This is probably explained by no additive being added to the non-aqueous electrolyte solution. Next, in Comparative Examples 8 and 9, the drop in capacitance maintenance rate and the rise in rate of change in internal resistance were reduced compared to Comparative Example 7, but the rate of change in internal resistance did not become sufficiently low and still remained above 200%. This is probably explained by no second additive being added to the non-aqueous electrolyte solution, although the first additive was added. Next, in Comparative Examples 10 and 11, the rate of change in internal resistance did not become sufficiently low despite adding the first additive and third additive. This is probably explained by no second additive being added. In Comparative Examples 12 and 13, the rate of change in internal resistance did not become sufficiently low despite adding the first additive and second additive. In Comparative Example 12, this is probably explained by the additive quantity of the first additive being too large. In Comparative Example 13, this is probably explained by the additive quantity of the second additive being too large.

By contrast, the drop in capacitance maintenance rate was reduced, and the rate of change in internal resistance also became sufficiently low (below 200%), in Examples 10 to 15 and 19 to 21. This is probably explained by the addition, as the first additive, of an oxalate complex salt of lithium by 1.0 percent by weight to 3.0 percent by weight in concentration, and the addition, as the second additive, of a straight-chain carbonate by 1.0 percent by weight to 9.0 percent by weight. Next, in Examples 16 to 18 and 22, the rate of change in internal resistance became even lower than in Examples 10 to 15. This is probably explained by the further addition of the third additive by 1.0 percent by weight to 3.0 percent by weight.

The foregoing explained examples of the present invention; however, it should be noted that the present invention is not limited to these specific examples in any way, and various variations and modifications are permitted so long as they do not deviate from the key points of the present invention as described in "What Is Claimed Is."

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-186984, filed Sep. 27, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. An electrolyte solution for electrochemical device, comprising:
    a cyclic carbonate solvent containing 1.0 mol/L to 1.6 mol/L of $LiPF_6$ as an electrolyte;
    an oxalate complex salt of lithium whose additive quantity relative to the electrolyte solution accounts for 1.0 percent by weight to 3.0 percent by weight; and
    a straight-chain carbonate whose additive quantity relative to the electrolyte solution accounts for 1.0 percent by weight to 9.0 percent by weight.

2. The electrolyte solution for electrochemical device according to claim 1, wherein the oxalate complex salt is at least one of lithium bis (oxalate) borate, lithium difluorobis (oxalate) phosphate, and lithium tetrafluorooxalate phosphate.

3. The electrolyte solution for electrochemical device according to claim 1, wherein the straight-chain carbonate is at least one of dimethyl carbonate, ethyl methyl carbonate, and diethyl carbonate.

4. The electrolyte solution for electrochemical device according to claim 1, further comprising vinylene carbonate, fluoroethylene carbonate, or methylene bis (ethane sulfonate), whose additive quantity relative to the electrolyte solution accounts for 1.0 percent by weight to 3.0 percent by weight.

5. An electrochemical device comprising an electric storage element constituted by a positive electrode and a negative electrode, which are layered with separators in between;
    wherein the electrolyte solution for electrochemical device according to claim 1 is impregnated into an active material for the positive electrode and an active material for the negative electrode, or into the separators.

6. The electrolyte solution for electrochemical device according to claim 4, which consists essentially of: the electrolyte solution; the oxalate complex salt of lithium; the straight-chain carbonate; and the vinylene carbonate, fluoroethylene carbonate, or methylene bis(ethane sulfonate).

* * * * *